(12) United States Patent
Morita et al.

(10) Patent No.: US 11,458,931 B2
(45) Date of Patent: Oct. 4, 2022

(54) WIPER DRIVE CIRCUIT

(71) Applicant: DENSO ELECTRONICS CORPORATION, Anjo (JP)

(72) Inventors: Manabu Morita, Anjo (JP); Shigekazu Sugimoto, Anjo (JP)

(73) Assignee: DENSO ELECTRONICS CORPORATION, Anjo (JP)

( * ) Notice: Subject to any disclaimer, the term of this patent is extended or adjusted under 35 U.S.C. 154(b) by 64 days.

(21) Appl. No.: 16/872,411

(22) Filed: May 12, 2020

(65) Prior Publication Data

US 2020/0269814 A1   Aug. 27, 2020

Related U.S. Application Data

(62) Division of application No. 16/278,248, filed on Feb. 18, 2019, now Pat. No. 11,345,314.

(30) Foreign Application Priority Data

Feb. 21, 2018  (JP) .............................. JP2018-029008
Jan. 31, 2019  (JP) .............................. JP2019-015474

(51) Int. Cl.
| | |
|---|---|
| *B60S 1/08* | (2006.01) |
| *H02P 1/18* | (2006.01) |
| *B60R 16/033* | (2006.01) |
| *H02J 9/06* | (2006.01) |
| *H02P 1/02* | (2006.01) |

(52) U.S. Cl.
CPC ................. *B60S 1/08* (2013.01); *H02J 9/061* (2013.01); *H02J 9/066* (2013.01); *H02P 1/18* (2013.01); *B60R 16/033* (2013.01); *H02J 9/068* (2020.01); *H02P 1/029* (2013.01)

(58) Field of Classification Search
CPC ... B60S 1/08; H02J 9/061; H02J 9/066; H02J 9/068; H02P 1/029; H02P 1/18
USPC ......................................... 318/139; 180/65.29
See application file for complete search history.

(56) References Cited

U.S. PATENT DOCUMENTS

| | | | |
|---|---|---|---|
| 5,117,168 A | 5/1992 | Nomura et al. | |
| 9,802,562 B2 * | 10/2017 | Yasunori | ............... H02J 7/0063 |
| 2004/0056620 A1 | 3/2004 | Takagi | |
| 2006/0087267 A1* | 4/2006 | Kawamura | ............... H02P 3/12 |
| | | | 318/364 |

FOREIGN PATENT DOCUMENTS

| | | | |
|---|---|---|---|
| JP | 2002-029389 | * | 1/2002 |
| JP | 2002-029389 A | | 1/2002 |

(Continued)

OTHER PUBLICATIONS

U.S. Appl. No. 16/872,411, filed May 12, 2020, Manabu Morita.
U.S. Appl. No. 16/278,248, filed Feb. 18, 2019, Manabu Morita.

*Primary Examiner* — Muhammad S Islam
*Assistant Examiner* — Zemenay T Truneh
(74) *Attorney, Agent, or Firm* — Harness, Dickey & Pierce, P.L.C.

(57) ABSTRACT

When a power failure does not occur, power supply to a first terminal of a wiper motor is performed by a first battery, and power supply to a second terminal of the wiper motor is performed by a second battery. When a power failure occurs in one of the first battery or the second battery, power supply to the wiper motor is performed by the other battery that is not in power failure.

5 Claims, 4 Drawing Sheets

(56) References Cited

FOREIGN PATENT DOCUMENTS

| | | |
|---|---|---|
| JP | 2002-037035 A | 2/2002 |
| JP | 2004-114748 A | 4/2004 |
| JP | 2005-198478 A | 7/2005 |

* cited by examiner

US 11,458,931 B2

WIPER DRIVE CIRCUIT

CROSS REFERENCE TO RELATED APPLICATIONS

This application is a divisional Application of U.S. patent application Ser. No. 16/278,248 filed on Feb. 18, 2019 which claims the benefit of priority from Japanese Patent Application No. 2018-029008 filed on Feb. 21, 2018 and Japanese Patent Application No. 2019-015474 filed on Jan. 31, 2019. The entire disclosures of the above applications are incorporated herein by reference.

TECHNICAL FIELD

The present disclosure relates to a wiper drive circuit.

BACKGROUND

Conventionally, a wiper drive circuit for driving a wiper device provided in a vehicle is known. The wiper drive circuit is a device that inputs an operation state of a wiper switch operated by a driver to an electronic control device for wiper control (hereinafter referred to as a control ECU) and controls a wiper motor according to the operation state to drive the wiper device.

SUMMARY

A present disclosure provides a wiper drive circuit that energizes from a first battery to a first terminal of a wiper motor and energizes from a second battery to a second terminal of the wiper motor. When a power failure occurs in one of the first battery or the second battery, the wiper drive circuit energizes from the other battery that is not in power failure to the wiper motor.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

In recent years, an automatic driving of a vehicle by an advanced driving system (ADAS) has been developed. A redundant power supply system with two-battery configuration has been studied for important loads so that risk avoidance can be continued, for example, even when a 12 V battery power supply system fails during automatic driving. For example, left and right headlamps are connected with separate power sources. Even when one of the power sources fails, lighting by either one of the left and right headlamps is performed based on the other power source to secure visibility.

In an aspect of securing visibility during automatic driving, a wiper device is also an important load. However, in a general power supply system for a wiper motor for driving a wiper device for a front wind shield, a redundant measure of power supply is difficult.

Figure 3:
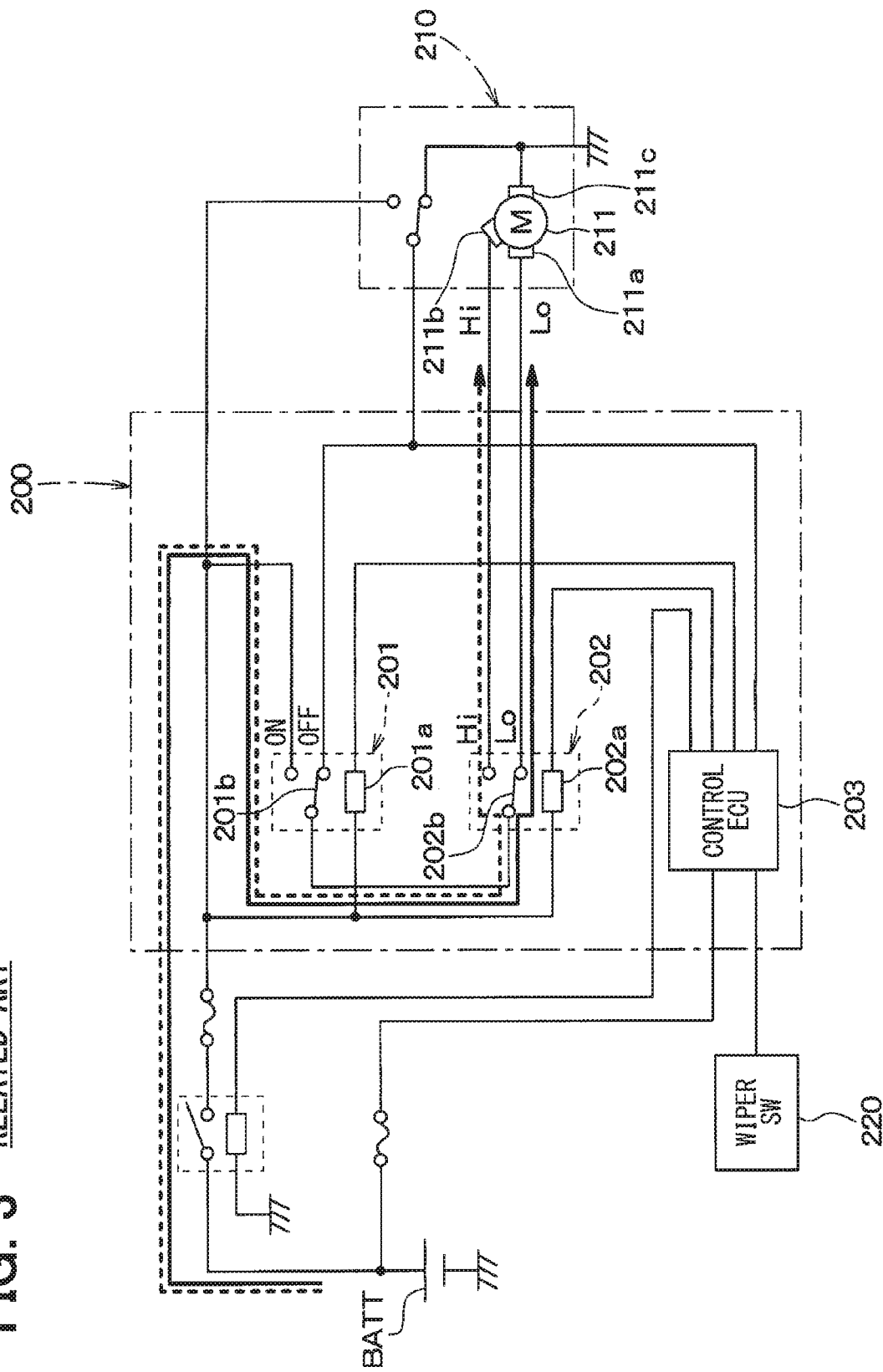
FIG. 3 is a circuit diagram showing a wiper drive circuit according to a related art.

For example, a wiper drive circuit 200 for driving a wiper motor 211 according to a related art has a circuit configuration shown in FIG. 3. The wiper drive circuit 200 includes a main relay 201, a switching relay 202, and a control ECU 203, and controls the wiper motor 211 provided in a motor unit 210. When the wiper switch 220 is operated, the control ECU 203 switches a main relay switch 201b from an off state to an on state by performing energization to a relay coil 201a of the main relay 201. Further, the control ECU 203 performs or stops an energization to a relay coil 202a of the switching relay 202 based on to which of wiper speeds Lo or Hi the wiper switch 220 is operated, so as to connect a movable contact of a switching relay switch 202b to either a Lo contact or a Hi contact.

When the driver operates the wiper switch 220 so that the wiper speed is set to Lo, an electric power is supplied from a battery BATT through a path indicated by the solid arrow in FIG. 3. Specifically, the electric power is supplied from the battery BATT to a Lo terminal 211a of the wiper motor 211 through a Lo contact side of the main relay 201 and the switching relay 202. When the driver operates the wiper switch 220 so that the wiper speed is set to Hi, the electric power is supplied from the battery BATT through a path indicated by the dashed arrow in FIG. 3. Specifically, the electric power is supplied from the battery BATT to a Hi terminal 211b of the wiper motor 211 through a Hi contact side of the main relay 201 and the switching relay 202.

In the above-described configuration, the main relay 201 and the switching relay 202 are connected in series and the electric power is supplied from the one battery BATT as the power source. Accordingly, the power supply to the Lo terminal 211a and the Hi terminal 211b of the wiper motor 211 can be switched. Thus, it is difficult to form such a circuit configuration that the electric power is supplied from two power sources.

As countermeasures, it can be considered to provide a new wiper motor that can be coped with a redundant power supply or to employ a two-motor system in which two motors with separate power sources are respectively provided for two right and left wiper devices. However, it becomes necessary to newly design a wiper motor, or to provide a circuit configuration of the two-motor system, which complicates a system and increases a cost.

A wiper drive circuit according to an aspect of the present disclosure is configured to control driving of a wiper motor having a first terminal, a second terminal, and a ground terminal based on power supply from a first battery and a second battery provided separately from each other in a vehicle, and includes a first control switch, a second control switch, and an electronic control unit. The first control switch controls connection and disconnection between the first battery and the first terminal. The second control switch controls connection and disconnection between the second battery and the second terminal. The electronic control unit is configured to turn on the first control switch and turn off the second control switch to energize from the first battery to the first terminal when a wiper switch is operated into a first mode to drive the wiper motor at a first speed, and configured to turn on the second control switch and turn off the first control switch to energize from the second battery to the second terminal when the wiper switch is operated into a second mode to drive the wiper motor at a second speed higher than the first speed.

In the above-described configuration, the electronic control unit is configured to monitor a potential corresponding to a potential of the first battery and a potential corresponding to a potential of the second battery, configured to turn on the second control switch to energize from the second battery to the second terminal to drive the wiper motor when determining that a power failure occurs in the first battery while the wiper switch is operated in the first mode, and configured to turn on the first control switch to energize from the first battery to the first terminal to drive the wiper motor when determining that a power failure occurs in the second battery while the wiper switch is operated in the second mode.

In this way, when a power failure does not occur, the power supply to the first terminal is performed by the first battery and the power supply to the second terminal is performed by the second battery. When a power failure occurs in one of the first battery or the second battery, the power supply to the wiper motor is performed by the other battery that is not in power failure. Accordingly, the wiper device can be driven and a visibility can be secured even when the power failure occurs. Therefore, the wiper drive circuit with a simple circuit configuration applicable to a redundant system with a two-battery configuration can be provided.

A wiper drive circuit according to another aspect of the present disclosure is configured to control driving of a wiper motor having a first terminal, a second terminal, and a ground terminal based on power supply from a battery provided in a vehicle, and includes a first control switch, a second control switch, and an electronic control unit. The first control switch controls connection and disconnection between the battery and the first terminal. The second control switch controls connection and disconnection between the battery and the second terminal. The electronic control unit is configured to turn on the first control switch and turn off the second control switch to energize from the battery to the first terminal when a wiper switch is operated into a first mode to drive the wiper motor at a first speed, and is configured to turn on the second control switch and turn off the first control switch to energize from the battery to the second terminal when the wiper switch is operated into a second mode to drive the wiper motor at a second speed higher than the first speed. The electronic control unit is configured to monitor a potential corresponding to a potential of the battery, is configured to turn on the first control switch to energize from the battery to the first terminal when determining that a power failure of the battery does not occur while the wiper switch is operated in the first mode, and is configured to turn on the second control switch to energize from the battery to the second terminal when determining that a power failure of the battery does not occur while the wiper switch is operated in the second mode.

A wiper drive circuit according to another aspect of the present disclosure is configured to control driving of a wiper motor having a first terminal, a second terminal, and a ground terminal based on power supply from a battery provided in a vehicle, and includes a first control switch, a second control switch, an electronic control unit, a first input wiring, and a second input wiring. The first control switch controls connection and disconnection of a first energizing wiring that is a power supply line between the battery and the first terminal. The second control switch controls connection and disconnection of a second energizing wiring that is a power supply line between the battery and the second terminal. The electronic control unit is configured to turn on the first control switch and turn off the second control switch to energize from the battery to the first terminal when a wiper switch is operated into a first mode to drive the wiper motor at a first speed, and is configured to turn on the second control switch and turn off the first control switch to energize from the battery to the second terminal when the wiper switch is operated into a second mode to drive the wiper motor at a second speed higher than the first speed. The first input wiring connects the electronic control unit and the first energizing wiring between the battery and the first control switch. The second input wiring connects the electronic control unit and the second energizing wiring between the battery and the second control switch. The electronic control unit is configured to receive a potential corresponding to a potential of the battery through the first input wiring and receive a potential corresponding to the potential of the battery through the second input wiring. When the electronic control unit determines that a power failure of the battery occurs in one of the first energizing wiring or the second energizing wiring while the wiper switch is operated in the first mode or the second mode, the electronic control unit drives the wiper motor by energizing through the other of the first energizing wiring or the second energizing wiring in which the power failure is not determined.

Hereinafter, embodiments of the present disclosure will be described with reference to the drawings. In the following embodiments, the same or equivalent parts are denoted by the same reference numerals.

First Embodiment

Figure 1:
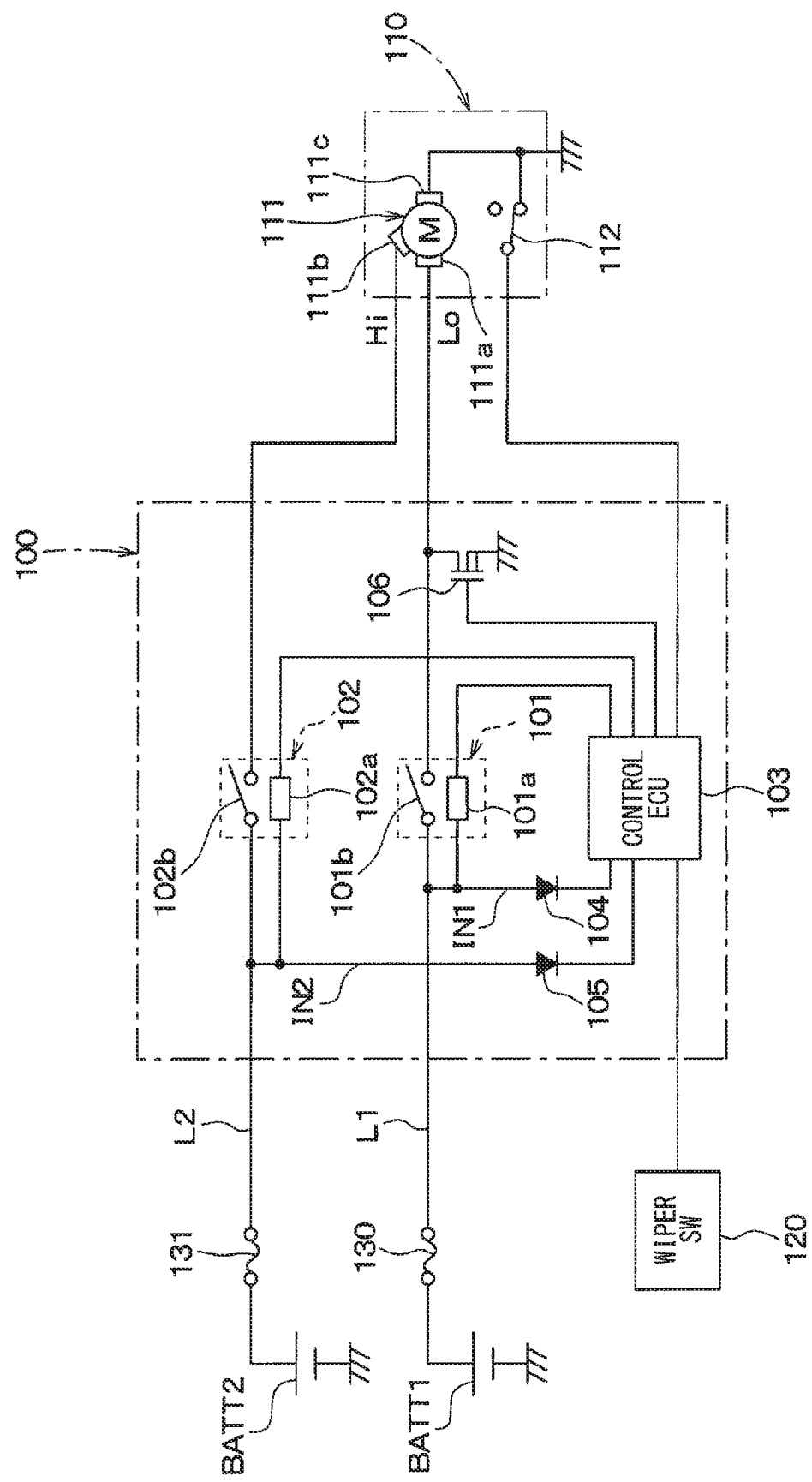
FIG. 1 is a circuit diagram showing a case in which a wiper drive circuit according to a first embodiment is applied to a redundant system with a two-battery configuration.

A wiper drive circuit 100 according to a first embodiment will be described. FIG. 1 is a circuit diagram showing a case in which a wiper drive circuit according to the present embodiment is applied to a redundant system with a two-battery configuration.

As shown in FIG. 1, the wiper drive circuit 100 includes a first relay 101, a second relay 102, and a control ECU 103. The wiper drive circuit 100 is provided for controlling a wiper motor 111 provided in a motor unit 110. The wiper motor 111 drives a wiper device of a front windshield (not shown), and is a general-purpose motor including a Lo terminal 111a corresponding to a first terminal, a Hi terminal 111b corresponding to a second terminal, and a ground (GND) terminal 111c. The wiper motor 111 is rotated at a relatively low speed based on energization to the Lo terminal 111a and is rotated at a speed higher than when the Lo terminal 111a is energized based on energization to the Hi terminal 111b.

The first relay 101 includes a first relay coil 101a and a first switch 101b. The first relay coil 101a controls on and off of the first switch 101b based on energization from the control ECU 103. The first switch 101b controls connection and disconnection of a first energizing wiring L1 that connects a first battery BATT1 and the Lo terminal 111a of the wiper motor 111. When the first relay coil 101a is not energized, the first switch 101b disconnects the first energizing wiring L1 to be in a cutoff state. When the first relay coil 101a is energized, the first switch 101b connections the first energizing wiring L1 so as to be in a conductive state and allows energization from the first battery BATT1 to the Lo terminal 111a.

The second relay 102 includes a second relay coil 102a and a second switch 102b. The second relay coil 102a controls on and off of the second switch 102*b* based on energization from the control ECU 103. The second switch 102*b* controls connection and disconnection of the second energizing wiring L2 that connects a second battery BATT2 and the Hi terminal 111*b* of the wiper motor 111. When the second relay coil 102*a* is not energized, the second switch 102*b* disconnects the second energizing wiring L2 to be in a cutoff state. When the second relay coil 102*a* is energized, the second switch 102*b* connects the second energizing wiring L2 to be in a conductive state and allows energization from the second battery BATT2 to the Hi terminal 111*b*.

The control ECU 103 controls the first relay 101 and the second relay 102 based on an operation state of a wiper switch (wiper SW) 120 to control on and off of the wiper motor 111.

More specifically, when the wiper switch 120 is operated by a driver into a Lo mode so as to set a wiper speed to a low speed Lo corresponding to a first speed, the control ECU 103 performs control to energize the Lo terminal 111*a* of the wiper motor 111 through the first relay 101. In other words, the control ECU 103 energizes the first relay coil 101*a* to turn on the first switch 101*b*. Accordingly, the Lo terminal 111*a* is energized from the first battery BATT1 through the first energizing wiring L1. At the time, the control ECU 103 does not operate the second relay 102 and the second switch 102*b* is in an off state.

When the wiper switch 120 is operated by the driver into a Hi mode so as to set the wiper speed to Hi corresponding to a second speed higher than Lo, the control ECU 103 performs control to energize the Hi terminal 111*b* of the wiper motor 111 through the second relay 102. In other words, the control ECU 103 energizes the second relay coil 102*a* to turn on the second switch 102*b*. Accordingly, the Hi terminal 111*b* is energized from the second battery BATT2 through the second energizing wiring L2. At the time, the control ECU 103 does not operate the first relay 101 and the first switch 101*b* is in an off state.

Further, the control ECU 103 monitors a power failure of the first battery BATT1 and the second battery BATT2, so that when one of the batteries fails, the wiper motor 111 can be driven by using the other as a power source.

Specifically, the control ECU 103 is connected to the first energizing wiring L1 through a first input wiring IN1. As a potential corresponding to a potential of the first battery BATT1, a potential between the first battery BATT1 and the first relay 101 (hereinafter, referred to as a first potential) is input to the control ECU 103. In addition, the control ECU 103 is connected to the second energizing wiring L2 through a second input wiring IN2. As a potential corresponding to a potential of the second battery BATT2, a potential between the second battery BATT2 and the second relay 102 (hereinafter referred to as a second potential) is input to the control ECU 103.

Thus, the control ECU 103 is operated by being supplied with power from at least one of the first battery BATT1 or the second battery BATT2, and determines whether the first potential and the second potential are normal voltage values to determine the power failure of the first battery BATT1 and the second battery BATT2. When the first potential is equal to or lower than a predetermined threshold value, for example, the GND potential, the control ECU 103 determines that the first battery BATT1 is in power failure. In addition, when the second potential is equal to or lower than a predetermined threshold value, for example, the GND potential, the control ECU 103 determines that the second battery BATT2 is in power failure. When the control ECU 103 determines that one of the first battery BATT1 or the second battery BATT2 is in power failure in a state where the driver operates the wiper switch 120 to operate the wiper device, the control ECU 103 operates the wiper motor 11 using the other as the power source. Details of the operation will be described later.

The first input wiring IN1 and the second input wiring IN2 are respectively provided with diodes 104, 105 so as to restrict a sneak current from the control ECU 103 to the first battery BATT1 or the second battery BATT2. Since the diodes 104 and 105 are provided, even if a power failure occurs in one of the first battery BATT1 or the second battery BATT2, a power failure of the other due to a sneak current can be restricted.

For example, in a case where the first battery BATT1 is short-circuited and a power failure occurs, it is assumed that the first energizing wiring L1 becomes a grounded state. In this case, the potential input from the first input wiring IN1 to the control ECU 103 is 0. Depending on a circuit configuration inside the control ECU 103, the first input wiring IN1 and the second input wiring IN2 are electrically connected or in a state equivalent to be electrically connected. If the diodes 104 and 105 are not provided, a loop of a sneak current may be formed in such a manner that the sneak current flows from the second battery BATT2 to the first battery BATT1 through the second energizing wiring L2, the second input wiring IN2, the control ECU 103, the first input wiring IN1, and the first energizing wiring L1 in the stated order. When the above-described loop is formed, an electric power cannot be supplied from the second battery BATT2 to the wiper motor 111. Therefore, the diodes 104, 105 are provided so that a formation of the loop of the sneak current can be restricted, and an electric power can be supplied from one of the first battery BATT1 or the second battery BATT2, which is not in power failure, to the wiper motor 11.

The wiper drive circuit 100 further includes an off switch 106. The off switch 106 is formed of an N channel MOSFET, and controls connection and disconnection between the wiper motor 111 and the ground potential point. In the present embodiment, the off switch 106 is provided between the Lo terminal 111*a* and the ground potential point, and the off switch 106 is connected to the first energizing wiring L1.

The off switch 106 controls braking of the wiper motor 111 when driving of the wiper device is stopped and controls connection and disconnection between the high side of the wiper motor 111 and the ground potential point.

When the wiper switch 120 is switched from the Lo mode or the Hi mode to the off mode to stop the wiper motor 111, the first relay 101 or the second relay 102 is turned off to stop the energization to the wiper motor 111. At the time, an electromotive force is generated by a rotational inertia force of the wiper motor 111, and braking of the wiper motor 111 may be delayed. Thus, the off switch 106 is turned off so that potentials at both ends of the wiper motor 111 are set to the ground potential, that is, 0, and a brake can be applied to the wiper motor 111 more quickly. In the above-describe circuit configuration, the off switch 106 is provided to set the potential of the Lo terminal 111*a* corresponding to the first terminal to the ground potential. Alternatively, a circuit configuration in which the off switch 106 is provided to set the potential of the Hi terminal corresponding to the second terminal to the ground potential may also be employed.

In the motor unit 110 including the wiper motor 111, a wiper cam switch 112 is provided. Since the wiper cam switch 112 is well known, it will not be described here in detail. When the wiper device is driven from a stop position and is in a middle position, the wiper cam switch 112 is disconnected from the ground potential point. When the wiper device is in the stop position, the wiper cam switch 112 is connected to the ground potential point. Due to the operation of the wiper cam switch 112, even if the driver turns off the wiper switch 120 when the wiper device is in the middle position, the wiper device is returned to the stop position with certainty.

Between the first battery BATT1 and the first relay 101 of the first energizing wiring L1 and between the second battery BATT2 and the second relay 102 of the second energizing wiring L2, a first fuse 130 and a second fuse 131 are respectively provided. Thus, an overcurrent can be restricted from flowing to the wiper motor 111.

With the circuit configuration as described above, the wiper drive circuit 100 is configured. Next, an operation of the wiper drive circuit 100 configured as described above will be described.

First, when the driver does not operate the wiper switch 120, since both the first relay 101 and the second relay 102 are off, power supply to the wiper motor 111 is not performed. Therefore, the wiper device is not driven.

Next, when the driver operates the wiper switch 120 to the Lo mode, a control signal to that effect is input from the wiper switch 120 to the control ECU 103. As a result, the control ECU 103 turns on the first switch 101*b* by energizing the first relay coil 101*a* so that energization from the first battery BATT1 to the Lo terminal 111*a* is performed through the first energizing wiring L1. Accordingly, the wiper motor 111 is driven at the wiper speed of Lo, and the wiper device is operated at a relatively low speed. At the time, the control ECU 103 does not operate the second relay 102. Therefore, energization from the second battery BATT2 to the wiper motor 111 is not performed.

Next, when the driver operates the wiper switch 120 to the Hi mode, a control signal to that effect is input from the wiper switch 120 to the control ECU 103. As a result, the control ECU 103 turns on the second switch 102*b* by energizing the second relay coil 102*a* so that energization from the second battery BATT2 to the Hi terminal 111*b* is performed through the second energizing wiring L2. Accordingly, the wiper motor 111 is driven at the wiper speed of Hi, and the wiper device is operated at a relatively high speed. At the time, the control ECU 103 does not operate the first relay 101. Therefore, energization from the first battery BATT1 to the wiper motor 111 is not performed.

When the driver turns off the wiper switch 120 to stop driving of the wiper device, a control signal to that effect is input from the wiper switch 120 to the control ECU 103. As a result, the control ECU 103 turns off both the first relay 101 and the second relay 102, and turns on the off switch 106. Therefore, even if the potential at the both ends of the wiper motor 111 is set to the ground potential and the electromotive force is generated by the rotational inertia force of the wiper motor 111, a brake can be quickly applied to the wiper motor 111 to stop the wiper motor 111.

When the above-described operation is performed, the control ECU 103 acquires the first potential and the second potential through the first input wiring IN1 and the second input wiring IN2 to monitor a power failure in the first battery BATT1 and the second battery BATT2.

Thus, when the control ECU 103 determines that a power failure occurs in the first battery BATT1 while energizing the Lo terminal 111*a* through the first energizing wiring L1, the control ECU 103 turns on the second relay 102 to energize the Hi terminal 111*b* through the second energizing wiring L2. Further, when the control ECU 103 determines that a power failure occurs in the second battery BATT2 while energizing the Hi terminal 111*b* through the second energizing wiring L2, the control ECU 103 turns on the first relay 101 to energize the Lo terminal 111*a* through the first energizing wiring L1.

As a result, even if a power failure occurs in one of the first battery BATT1 or the second battery BATT2, the power supply to the wiper motor 111 can be performed by the other battery that is not in power failure.

As described above, in the wiper drive circuit 100 according to the present embodiment, when a power failure does not occur, the power supply to the Lo terminal 111*a* is performed by the first battery BATT1, and the power supply to the Hi terminal 111*b* is performed by the second battery BATT2. Then, when a power failure occurs in one of the first battery BATT1 or the second battery BATT2, the power supply to the wiper motor 111 is performed by the other battery that is not in power failure. Accordingly, the wiper device can be driven and a visibility can be secured even when the power failure occurs.

Since an existing wiper motor can be used as the wiper motor 111, it is not necessary to newly design the wiper motor 111. Even if a wiper motor including the Lo terminal 111*a* and the Hi terminal 111*b* and capable of changing the rotation speed is newly provided as the wiper motor 111, the wiper drive circuit 100 according to the present embodiment can also be applied to the wiper motor 111.

A case where the wiper drive circuit 100 is applied to a two-battery redundant system has been described above. In some vehicles, a case where the wiper drive circuit is applied to the redundant system and a case where the wiper drive circuit is not applied to the redundant system may be distinguished according to grades of the vehicles. At the time, if a wiper drive circuit can cope with either case, the common wiper drive circuit can be mounted. Thus, the number of parts can be reduced and a manufacturing line can be used in common. Thus, the wiper drive circuit 100 is configured to be applied also to a one-battery system that is not a redundant system.

Figure 2A:
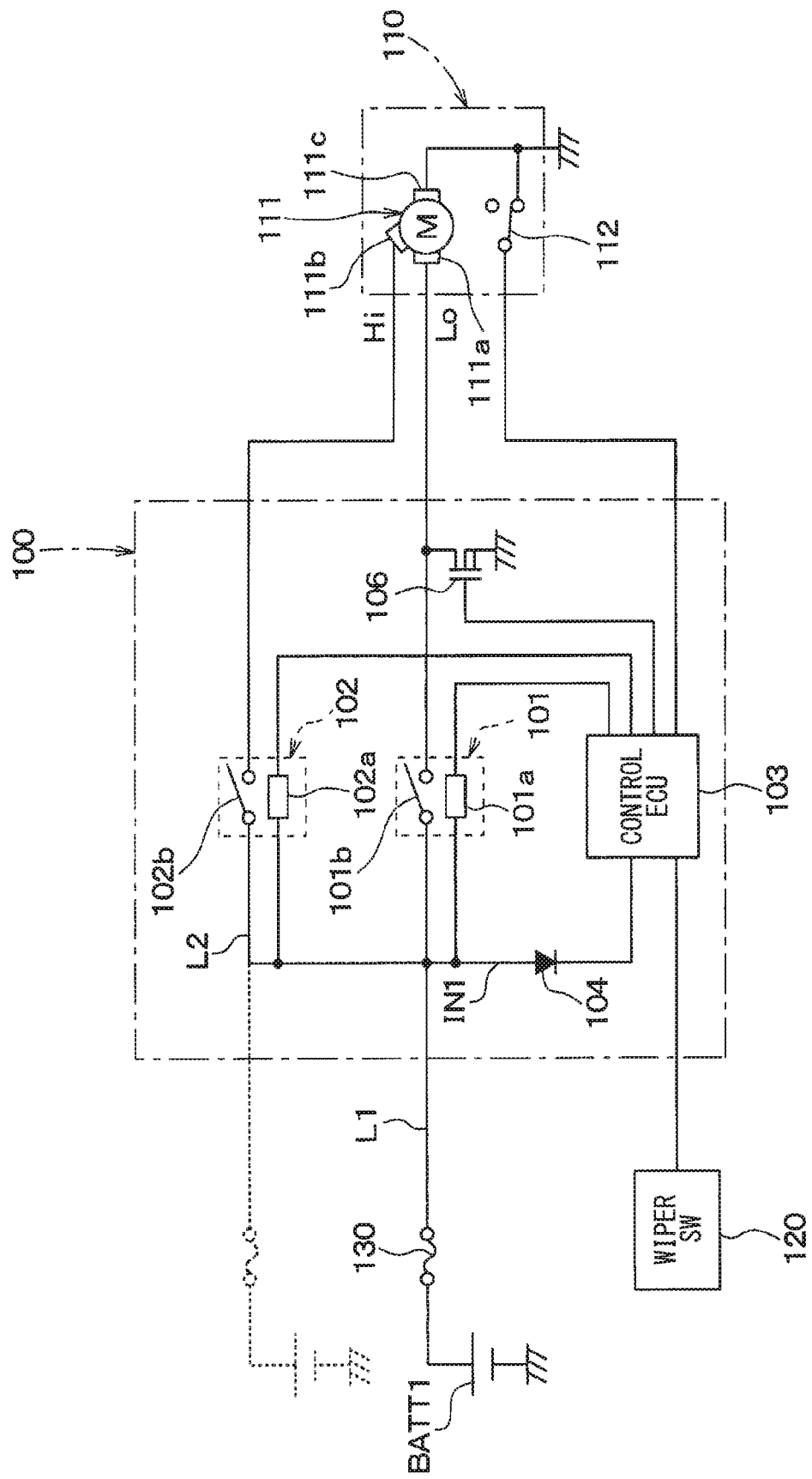
FIG. 2A is a circuit diagram showing a case in which the wiper drive circuit according to the first embodiment is applied to a one-battery configuration.

FIG. 2A shows an example of a circuit configuration when the wiper drive circuit 100 is applied to a one-battery system.

As shown in FIG. 2A, the second energizing wiring L2 and the second input wiring IN2 are connected to the first energizing wiring L1 between the first battery BATT1 and the first relay 101 so that the second relay 102 is also connected to the first battery BATT1. Then, a potential between the first battery BATT1 and the first relay 101 and the second relay 102 is input to the control ECU 103. Specifically, the potential of the first battery BATT1 is input to the control ECU 103 through the first input wiring IN1. In addition, the first input wiring IN1 is provided with the diode 104 to restrict a sneak current.

In the present example, the potential of the first battery BATT1 is input to the control ECU 103 through the first input wiring IN1. However, since it is only required to monitor the potential of the first battery BATT1 by the control ECU 103, a connection relation can be optionally set. For example, the potential of the first battery BATT 1 may be input to the control ECU 103 through the second input wiring IN2. In such a case, as shown in FIG. 1, the second input wiring IN2 is provided with the diode 105 to restrict a sneak current. Although it is not necessary to input the potential of the first battery BATT1 to the control ECU 103 through both of the first input wiring IN1 and the second input wiring IN2, the circuit configuration shown in FIG. 1 may also be used as it is. In such a case, a sneak current can be restricted by leaving both the diodes 104, 105, and the whole circuit configuration of the wiper drive circuit 100 can be the same as in a case of the two-battery system.

With such a configuration, an operation when a power failure does not occur is performed in a manner similar to the first embodiment, so that both the energization to the Lo terminal 111*a* and the energization to the Hi terminal 111*b* can be performed from the first battery BATT1.

Figure 2B:
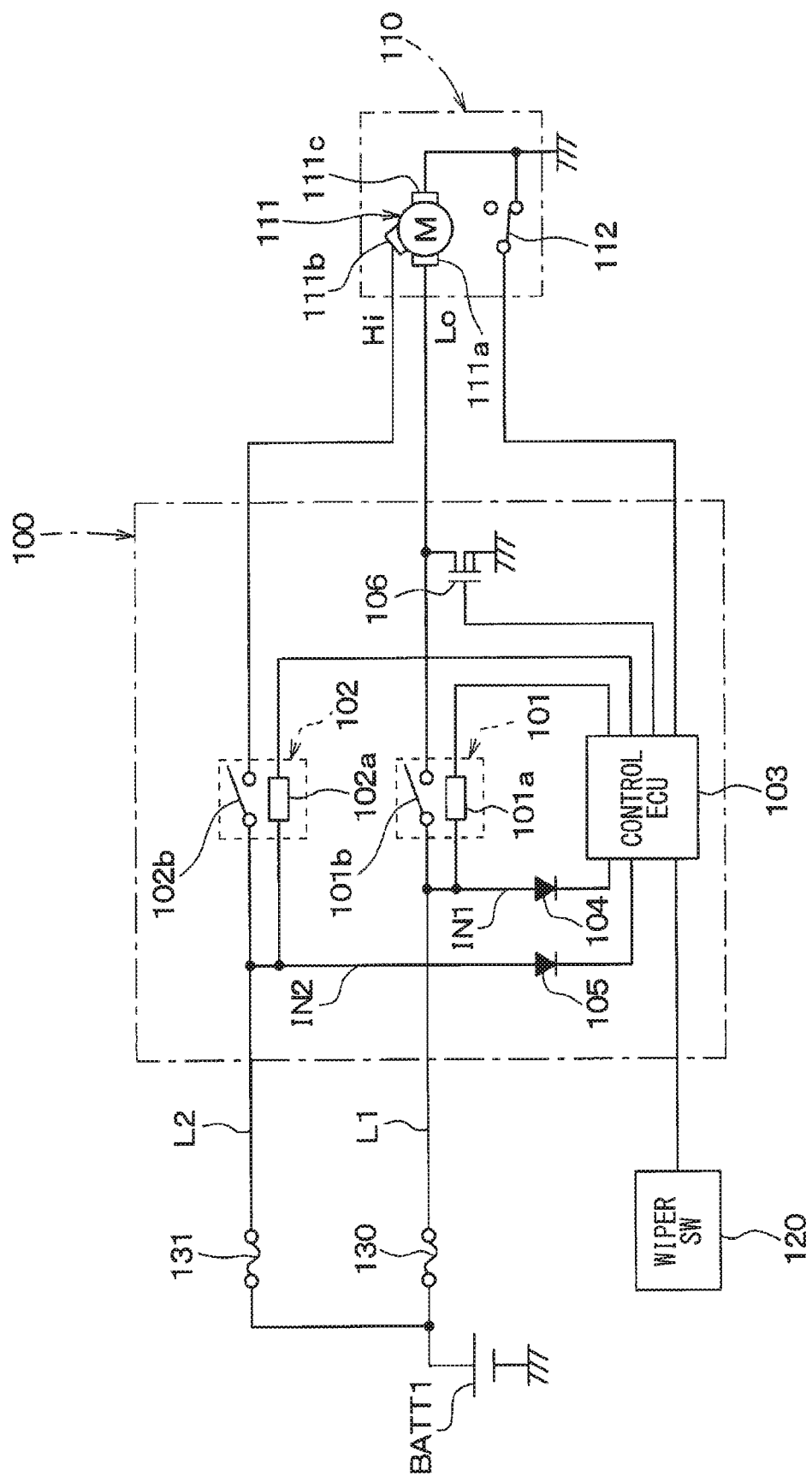
FIG. 2B is a circuit diagram showing another case in which the wiper drive circuit according to the first embodiment is applied to a one-battery configuration.

FIG. 2B shows another example of a circuit configuration when the wiper drive circuit 100 is applied to a one-battery system.

As describe above, in a case where the wiper drive circuit 100 is applied to one-battery system, the circuit configuration shown in FIG. 1 can also be used as it is. In such a case, as shown in FIG. 2B, both terminals of the first fuse 130 and the second fuse 131 opposite to terminals connected to the drive circuit 100 are connected to the first battery BATT1. Also in such a configuration, basically the same operation as in the two-battery system is performed. Then, a power failure of power supply lines connected to the first fuse 130 and the second fuse 131, that is, a power failure of the first battery BATT1 in the first energizing wiring L1 and the second energizing wiring L2 is monitored by the control ECU 103, and if a power failure in one of the power supply lines is determined, the wiper motor 111 is driven by using the other power supply line that is not in power failure.

A power failure may be caused by various reasons, such as a fuse blow, a harness open, and a short circuit. In any cases, the control ECU 103 can detect as a power failure based on the input potential.

As a result, the wiper drive circuit 100 can be applied not only to the redundant system having a two-battery configuration but also to a non-redundant system. Therefore, the number of parts can be reduced, and a manufacturing line can be used in common.

Other Embodiments

The present disclosure is not limited to the above-described embodiment and may be suitably modified.

For example, the wiper drive circuit 100 described in the above-described embodiment is merely one example, and other circuit configurations may be used. For example, in the above-described embodiment, the first relay 101 and the second relay 102, which are mechanical switches, are used as the first control switch for controlling connection and disconnection of the first energizing wiring L1 and the second control switch for controlling connection and disconnection of the second energizing wiring L2. However, this merely shows one example of the first control switch and the second control switch, and, for example, at least one of the first control switch or the second control switch may be formed of a semiconductor switch such as a MOSFET.

However, since a parasitic diode is formed in a semiconductor switch such as a MOSFET, when the first battery BATT1 or the second battery BATT2 is connected reversely in error, that is, when the first battery BATT1 or the second battery BATT2 are connected in a state where positive and negative polarities are reversed, an electric current may flow through a parasitic diode as a path. Thus, it is necessary to provide a reverse connection protection circuit in addition to the first control switch and the second control switch. However, when mechanical switches are used as in the above-described embodiment, the reverse connection protection circuit is not necessary and the circuit configuration can be simplified.

In the above embodiment, the diodes 104 and 105 are provided in the first input wiring IN1 and the second input wiring IN2, but it is not necessary to provide diodes if the control ECU 103 is configured so as to restrict a sneak current.

In the above-described embodiment, the wiper switch 120 is switched to the Lo mode in which the wiper motor 111 is set to the first speed Lo and the Hi mode in which the wiper motor 111 is set to the second speed Hi higher than the first speed. However, the wiper switch 120 may also have an Int mode that is an intermittent mode. Further, in the above-described embodiment, the first mode in which the wiper motor 111 is driven at the first speed is the Lo mode, and the second mode in which the wiper motor 111 is driven at the second speed is the Hi mode. However, the first mode and the second mode may also be indicated on the wiper switch 120 by numbers corresponding to a driving speed of the wiper motor 11 instead of Lo and Hi.

Furthermore, in the above-described embodiment, the potential of the first battery BATT1 is input as the first potential to the control ECU 103, and the potential of the second battery BATT2 is input as the second potential to the control ECU 103. However, these are merely examples, and potentials corresponding to the potentials of the first battery BATT1 and the second battery BATT2, for example, potentials obtained by dividing and dropping the potentials of the first battery BATT1 and the second battery BATT2 may also be input as the first potential and the second potential to the control ECU 103.

What is claimed is:

1. A wiper drive circuit configured to control driving of a wiper motor having a first terminal, a second terminal, and a ground terminal based on power supplied from a first battery and a second battery provided separately from each other in a vehicle, comprising:
    a first control switch controlling connection and disconnection between the first battery and the first terminal, the first control switch being connected to the first battery with first energizing wiring and the first energizing wiring having a first fuse between the first battery and the first control switch;
    a second control switch controlling connection and disconnection between the second battery and the second terminal, the second control switch being connected to the second battery with second energizing wiring and the second energizing wiring having a second fuse between the second battery and the second control switch;
    an electronic control unit configured to turn on the first control switch and turn off the second control switch to provide power from the first battery to the first terminal in response to a wiper switch being operated in a first mode to drive the wiper motor at a first speed, and configured to turn on the second control switch and turn off the first control switch to provide power from the second battery to the second terminal in response to the wiper switch being operated in a second mode to drive the wiper motor at a second speed that is higher than the first speed;
    a first input wiring connecting the electronic control unit to a point on the first energizing wiring between the first fuse and the first control switch;
    a second input wiring connecting the electronic control unit to a point on the second energizing wiring between the second fuse and the second control switch, the electronic control unit being supplied with power from at least one of the first battery through the first input wiring and the second battery through the second input wiring;

a first diode provided on the first input wiring to restrict a sneak current from the second battery to the first battery through the electronic control unit; and a second diode provided on the second input wiring to restrict a sneak current from the first battery to the second battery through the electronic control unit, wherein the electronic control unit is configured to receive, with the first input wiring, a first potential between the first fuse and the first control switch, the first potential corresponding to an available potential of the first battery, receive, with the second input wiring, a second potential between the second fuse and the second control switch, the second potential corresponding to an available potential of the second battery, compare the first potential with a predetermined threshold value, determine that a power failure has occurred in the first battery in response to the first potential being equal to or less than the predetermined threshold value, compare the second potential with the predetermined threshold value, determine that a power failure has occurred in the second battery in response to the second potential being equal to or less than the predetermined threshold value, turn on the second control switch to provide power from the second battery to the second terminal to drive the wiper motor in response to determining that the power failure has occured in the first battery while the wiper switch is operated in the first mode, and turn on the first control switch to provide power from the first battery to the first terminal to drive the wiper motor in response to determining that the power failure has occurred in the second battery while the wiper switch is operated in the second mode.

2. The wiper drive circuit according to claim 1, wherein the first control switch is a first relay including a first switch provided between the first battery and the first terminal and a first relay coil controlling on and off of the first switch, and the second control switch is a second relay including a second switch provided between the second battery and the second terminal and a second relay coil controlling on and off of the second switch.

3. The wiper drive circuit according to claim 1, further comprising an off switch controlling connection and disconnection between the first terminal or the second terminal and a ground potential point, wherein the electronic control unit is configured to stop energization from the first battery or the second battery to the wiper motor and turn on the off switch when the wiper switch is switched from the first mode or the second mode to an off mode to stop the wiper motor.

4. The wiper drive circuit according to claim 1, wherein the electronic control unit is configured to determine that the power failure has occurred in the first battery in response to the first fuse being blown and to determine that the power failure has occurred in the second battery in response to the second fuse being blown.

5. The wiper drive circuit according to claim 1, wherein:

the first fuse being blown causes the first potential between the first fuse and the first control switch, received by the electronic control unit from the first input wiring, to be equal to or less than the predetermined threshold value and causes the electronic control unit to determine that the power failure has occurred in the first battery; and the second fuse being blown causes the second potential between the second fuse and the second control switch, received by the electronic control unit from the second input wiring, to be equal to or less than the predetermined threshold value and causes the electronic control unit to determine that the power failure has occurred in the second battery.

* * * * *